US008401836B1

(12) United States Patent
Kumar et al.

(10) Patent No.: US 8,401,836 B1
(45) Date of Patent: Mar. 19, 2013

(54) OPTIMIZING PARAMETERS FOR MACHINE TRANSLATION

(75) Inventors: Shankar Kumar, New York, NY (US); Wolfgang Macherey, Mountain View, CA (US); Christopher James Dyer, College Park, MD (US); Franz Josef Och, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/528,426

(22) Filed: Jun. 20, 2012

Related U.S. Application Data

(63) Continuation of application No. 12/533,519, filed on Jul. 31, 2009.

(51) Int. Cl.
*G06F 17/28* (2006.01)
(52) U.S. Cl. ................................ 704/2; 704/5; 704/7
(58) Field of Classification Search ............ 704/2–8
See application file for complete search history.

(56) References Cited

U.S. PATENT DOCUMENTS

| | | | | |
|---|---|---|---|---|
| 5,748,850 | A * | 5/1998 | Sakurai | 706/50 |
| 7,856,351 | B2 * | 12/2010 | Yaman et al. | 704/9 |
| 7,957,971 | B2 * | 6/2011 | Gorin et al. | 704/257 |
| 2003/0110023 | A1 * | 6/2003 | Bangalore et al. | 704/5 |
| 2004/0101048 | A1 * | 5/2004 | Paris | 375/240.12 |
| 2004/0193414 | A1 * | 9/2004 | Calistri-Yeh et al. | 704/245 |
| 2007/0150257 | A1 * | 6/2007 | Cancedda et al. | 704/2 |
| 2007/0239432 | A1 * | 10/2007 | Soong et al. | 704/9 |
| 2007/0282590 | A1 | 12/2007 | Suzuki et al. | |
| 2009/0248416 | A1 * | 10/2009 | Gorin et al. | 704/257 |
| 2010/0004919 | A1 | 1/2010 | Macherey et al. | |
| 2010/0004920 | A1 | 1/2010 | Macherey et al. | |

OTHER PUBLICATIONS

Dean, J. et al., "MapReduce: Simplified Data Processing on Large Clusters," Proceedings of the 6th Symposium on Operating Systems Design and Implementation, Dec. 6, 2004, pp. 1-13.
Macherey, W. et al., "Lattice-based Minimum Error Rate Training for Statistical Machine Translation," In: Proceedings of the 2008 Conference on Empirical Methods in Natural Language Processing, Honolulu, Hawaii, Oct. 2008, pp. 725-734.
Tromble, R. et al., "Lattice Minimum Bayes-Risk Decoding for Statistical Machine Translation," Proceedings of the 2008 Conference on Empirical Methods in Natural Language Processing, Honolulu, Hawaii, Oct. 2008, pp. 620-629.
International Search Report and Written Opinion dated Sep. 16, 2010 for PCT International Application No. PCT/US2009/049613, 10 pages.
Papineni, K. et al., "Bleu: a Method for Automatic Evaluation of Machine Translation," IBM Research Report, RC22176 (W0109-022), Sep. 17, 2001, 10 pages.
Zhang, H. et al., "Efficient Multi-pass Decoding for Synchronous Context Free Grammars," Proceedings of ACL-08: HLT, Columbus, Ohio, Jun. 2008, pp. 209-217.

* cited by examiner

*Primary Examiner* — Douglas Godbold
(74) *Attorney, Agent, or Firm* — Remarck Law Group PLC

(57) ABSTRACT

Methods, systems, and apparatus, including computer program products, for language translation are disclosed. In one aspect, a method includes accessing a translation hypergraph that represents a plurality of candidate translations, the translation hypergraph including a plurality of paths including nodes connected by edges; calculating first posterior probabilities for each edge in the translation hypergraph; calculating second posterior probabilities for each n-gram represented in the translation hypergraph based on the first posterior probabilities; and performing decoding on the translation hypergraph using the second posterior probabilities to convert a sample text from a first language to a second language.

18 Claims, 8 Drawing Sheets

OPTIMIZING PARAMETERS FOR MACHINE TRANSLATION

CROSS-REFERENCE TO RELATED APPLICATIONS

This application is a continuation of U.S. patent application Ser. No. 12/533,519 filed on Jul. 31, 2009. The entire disclosure of the above application is incorporated herein by reference.

BACKGROUND

This specification relates to statistical machine translation.

Manual translation of text by a human operator can be time consuming and costly. One goal of machine translation is to automatically translate text in a source language to corresponding text in a target language. There are several different approaches to machine translation including example-based machine translation and statistical machine translation. Statistical machine translation attempts to identify a most probable translation in a target language given a particular input in a source language. For example, when translating a sentence from French to English, statistical machine translation identifies the most probable English sentence given the French sentence. This maximum likelihood translation can be expressed as:

$$\operatorname*{argmax}_{e} P(e \mid f),$$

which describes the English sentence, e, out of all possible sentences, that provides the highest value for P(e|f). Additionally, Bayes Rule provides that:

$$P(e \mid f) = \frac{P(e)P(f \mid e)}{P(f)}.$$

Using Bayes Rule, this most likely sentence can be rewritten as:

$$\operatorname*{argmax}_{e} P(e \mid f) = \operatorname*{argmax}_{e} P(e) P(f \mid e).$$

Consequently, the most likely e (i.e., the most likely English translation) is one that maximizes the product of the probability that e occurs and the probability that e would be translated into f (i.e., the probability that a given English sentence would be translated into the French sentence).

Components that perform translation portions of a language translation task are frequently referred to as decoders. In certain instances, a first decoder (a first-pass decoder) can generate a list of possible translations, e.g., an N-best list. A second decoder (a second-pass decoder), e.g., a Minimum Bayes-Risk (MBR) decoder, can then be applied to the list to ideally identify which of the possible translations are the most accurate, as measured by minimizing a loss function that is part of the identification. Typically, an N-best list contains between 100 and 10,000 candidate translations (or hypotheses). Increasing the number of candidate translations and efficiency in which the candidate translations are encoded improves the translation performance of an MBR decoder.

SUMMARY

This specification describes technologies relating to language translation.

In general, one aspect of the subject matter described in this specification can be embodied in methods that include the actions of accessing a translation hypergraph that represents a plurality of candidate translations, the translation hypergraph including a plurality of paths including nodes connected by edges; calculating first posterior probabilities for each edge in the translation hypergraph; calculating second posterior probabilities for each n-gram represented in the translation hypergraph based on the first posterior probabilities; and performing decoding on the translation hypergraph using the second posterior probabilities to convert a sample text from a first language to a second language. Other embodiments of this aspect include corresponding systems, apparatus, and computer program products.

These and other embodiments can optionally include one or more of the following features. The method further includes generating the translation hypergraph using Synchronous Context Free Grammars (SCFG). Performing decoding on the translation hypergraph includes: for each node, determining a score for each n-gram that is represented by a path from a source node of the translation hypergraph to the node, where the score is a highest second posterior probability for edges on paths that include the n-gram. Calculating second posterior probabilities includes calculating:

$$P(w \mid \Psi) = \sum_{E \in \Psi} \sum_{e \in E} f(e, w, E) P(E \mid F),$$

where P(w|Ψ) is the posterior probability of the n-gram w in the translation hypergraph; E is a candidate translation; F is the sample text in the first language, e is an edge; and f(e,w, E)=1 when w∈e, P(e|Ψ)>P(e'|Ψ), and e' precedes e on E; otherwise, f(e,w,E)=0.

In general, another aspect of the subject matter described in this specification can be embodied in methods that include the actions of accessing a translation lattice that represents a plurality of candidate translations, the translation lattice including a plurality of paths including nodes connected by edges; calculating posterior probabilities for each n-gram represented in the translation lattice including: determining, for each node, a score for each n-gram that is represented by a path from a source node of the translation lattice to the node, where the score is a highest posterior probability for edges on paths that include the n-gram; and performing decoding on the translation lattice using the scores to convert a sample text from a first language to a second language. Other embodiments of this aspect include corresponding systems, apparatus, and computer program products.

These and other embodiments can optionally include one or more of the following features. Calculating posterior probabilities includes calculating:

$$P(w \mid \Psi) = \sum_{E \in \Psi} \sum_{e \in E} f(e, w, E) P(E \mid F),$$

where P(w|Ψ) is the posterior probability of the n-gram w in the translation lattice; E is a candidate translation; F is the sample text in the first language, e is an edge; and f(e,w,E)=1 when w∈e, P(e|Ψ)>P(e'|Ψ), and e' precedes e on E; otherwise, f(e,w,E)=0.

In general, another aspect of the subject matter described in this specification can be embodied in methods that include the actions of determining, for a plurality of feature functions in a translation hypergraph, a corresponding plurality of error surfaces for each of one or more candidate translations represented in the translation hypergraph; combining the plurality of error surfaces to produce a combined error surface; traversing the combined error surface to select weights for the feature functions that minimize error counts for traversing the combined error surface; and applying the selected weights to reduce an error count in a decoder that converts a sample of text from a first language to a second language. Other embodiments of this aspect include corresponding systems, apparatus, and computer program products.

These and other embodiments can optionally include one or more of the following features. Determining a corresponding plurality of error surfaces includes: generating a factor graph from the translation hypergraph; and generating the plurality of error surfaces from the factor graph. The method further includes generating the translation hypergraph using Synchronous Context Free Grammars (SCFG). The method further includes applying SCFG rules to line segments represented in the plurality of error surfaces to expand the plurality of error surfaces, and where combining the plurality of error surfaces includes calculating a sum of one or more first error surfaces and calculating a union of one or more second error surfaces. The sum is a Minkowski sum. The selected weights are applied to select a first candidate translation using Minimum-Bayes Risk (MBR). The method further includes performing a backoff and using Maximum A Posteriori (MAP) based on at least one of the selected weights to determine a second candidate translation. Using MBR includes calculating:

$$\hat{E} = \underset{E' \in \Psi}{\mathrm{argmax}} \sum_{i=0}^{N} \theta_i g_i(E', F), \text{ where } g_0(E', F) = |E'|,$$

$$g_i(E', F) = \sum_{w:|w|=i} \#_w(E') P(w|\Psi),$$

$\Psi$ is the translation hypergraph, $\theta_i$ represents the selected weights, E' is a candidate translation, F is the sample text in the first language, w is an n-gram, and $\#_w$ is a number of times w occurs in E'.

In general, another aspect of the subject matter described in this specification can be embodied in computer readable mediums that store data including a translation hypergraph that represents a plurality of candidate translations, the translation hypergraph including a plurality of paths including nodes connected by edges; where first posterior probabilities are associated with each edge in the translation hypergraph, and second posterior probabilities calculated based on the first posterior probabilities are associated with each n-gram represented in the translation hypergraph. Other embodiments of this aspect include corresponding systems, apparatus, and methods.

These and other embodiments can optionally include one or more of the following features. The second posterior probabilities are expressed as:

$$P(w|\Psi) = \sum_{E \in \Psi} \sum_{e \in E} f(e, w, E) P(E|F),$$

where $P(w|\Psi)$ is the posterior probability of the n-gram w in the translation hypergraph; E is a candidate translation; F is the sample text in the first language, e is an edge; and f(e,w, E)=1 when w∈e, P (e|Ψ)>P(e'|Ψ), and e' precedes e on E; otherwise, f(e,w,E)=0.

Particular embodiments of the subject matter described in this specification can be implemented to realize one or more of the following advantages. Efficient MBR decoding of a lattice or hypergraph increases sizes of hypothesis and evidence spaces, thereby increasing a number of candidate translations available and the likelihood of obtaining an accurate translation. In addition, efficient MBR decoding provides a better approximation of a corpus BLEU score (as described in further detail below), thereby further improving translation performance. Furthermore, efficient MBR decoding of a lattice or hypergraph is runtime efficient, thereby increasing the flexibility of statistical machine translation since the decoding can be performed at runtime.

Efficient lattice or hypergraph-based Minimum Error Rate Training (MERT) provides exact error surfaces for all translations in a translation lattice or hypergraph, thereby further improving translation performance of a statistical machine translation system. The systems and techniques for efficient lattice or hypergraph-based MERT are also space and runtime efficient, thereby reducing an amount of memory used and increasing a speed of translation performance. Optimizing MBR parameters using efficient lattice or hypergraph-based MERT also reduces an amount of user intervention required to select MBR parameters, thereby providing a better approximation of a corpus BLEU score for use in MBR decoding and further improving translation performance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Statistical Translation Overview

Figure 1:
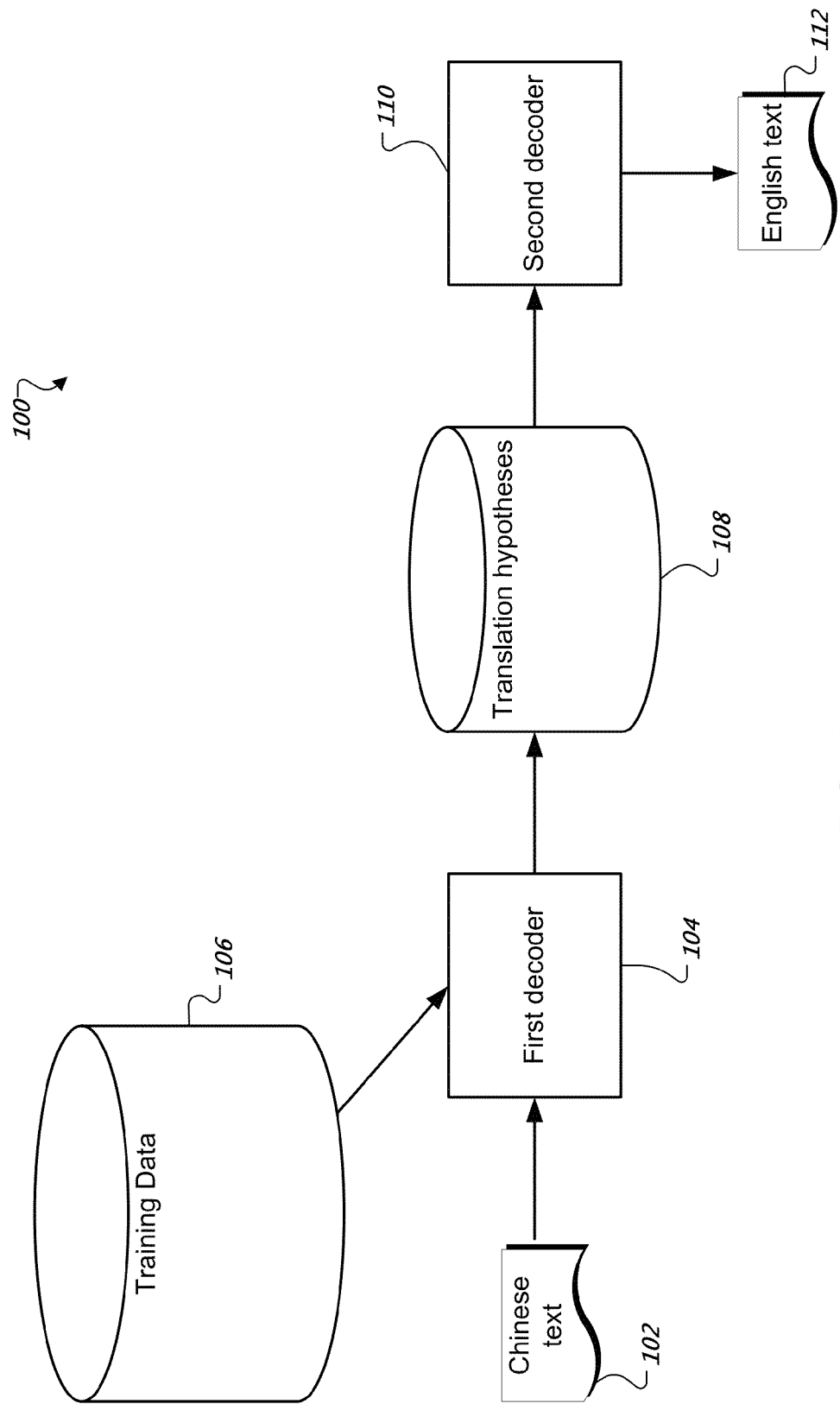
FIG. 1 is a conceptual diagram of an example process for translating input text from a source language to a target language.

Machine translation seeks to take input text in one language and accurately convert it into text in another language. Generally, the accuracy of a translation is measured against the ways in which expert humans would translate the input.

An automatic translation system can analyze prior translations performed by human experts to form a statistical model of translation from one language to another. No such model can be complete, however, because the meaning of words often depends on context. Consequently, a step-wise word-for-word transformation of words from one language to another may not provide acceptable results. For example, idioms such as "babe in the woods" or slang phrases, do not translate well in a literal word-for-word transformation.

Adequate language models can help provide such context for an automatic translation process. The models can, for example, provide indications regarding the frequency with which two words appear next to each other in normal usage, e.g., in training data, or that other groups of multiple words or elements (n-grams) appear in a language. An n-gram is a sequence of n consecutive tokens, e.g., words or characters. An n-gram has an order or size, which is the number of tokens in the n-gram. For example, a 1-gram (or unigram) includes one token; a 2-gram (or bi-gram) includes two tokens.

A given n-gram can be described according to different portions of the n-gram. An n-gram can be described as a context and a future token, (context, w), where the context has a length n−1 and w represents the future token. For example, the 3-gram "$c_1c_2c_3$" can be described in terms of an n-gram context and a future token, where $c_1$, $c_2$, and $c_3$ each represent a word (or a character in other examples). The n-gram left context includes all tokens of the n-gram preceding the last token of the n-gram. In the given example, "$c_1c_2$" is the context. The left most token in the context is referred to as the left token. The future token is the last token of the n-gram, which in the example is "$c_3$". The n-gram can also be described with respect to a right context. The right context includes all tokens of the n-gram following the first token of the n-gram, represented as a (n−1)-gram. In the example above, "$c_2c_3$" is the right context.

Each n-gram can have an associated probability estimate, e.g., a log-probability, that is calculated as a function of a count of occurrences in training data relative to a count of total occurrences in the training data. In some implementations, the probabilities of n-grams being a translation of input text is trained using the relative frequency of the n-grams represented in a target language as a reference translation of corresponding text in a source language in training data, e.g., training data including a set of text in the source language and corresponding text in the target language.

Additionally, in some implementations, a distributed training environment is used for large training data (e.g., terabytes of data). One example technique for distributed training is MapReduce. Details of MapReduce are described in J. Dean and S. Ghemawat, *MapReduce: Simplified Data Processing on Large Clusters*, Proceedings of the 6th Symposium on Operating Systems Design and Implementation, pp. 137-150 (Dec. 6, 2004).

Past usage represented by a training set can be used to predict how samples in one language should be translated to a target language. In particular, the n-grams, associated probability estimates, and respective counts can be stored in a language model for use by a decoder, e.g., a Bayesian decoder to identify translations for input text. A score indicating the likelihood that input text can be translated to corresponding text in a target language can be calculated by mapping the n-grams included in the input text to associated probability estimates for a particular translation.

Example Translation Process

FIG. 1 is a conceptual diagram of an example process 100 for translating input text from a source language to a target language. A source sample 102 is shown as a passage of Chinese text, and is provided to a first decoder 104. The decoder 104 can take a variety of forms and can be used in an attempt to maximize a posterior probability for the passage, given a training set of documents 106 that has been provided to the decoder 104 during a training phase for the decoder 104. In translating the sample 102, the decoder 104 can select n-grams from within the document and attempt to translate the n-grams. The decoder 104 can be provided with a re-ordering model, alignment model, and language model, among other possible models. The models direct the decoder 104 in selecting n-grams from within the sample 102 for translation. As one simple example, the model can use delimiters, e.g., punctuation such as a comma or period, to identify the end of an n-gram that may represent a word.

The decoder 104 can produce a variety of outputs, e.g., data structures that include translation hypotheses 108. For example, the decoder 104 can produce an N-best list of translations. In some implementations, the decoder 104 generates a representation of the translation hypotheses 108 that is encoded in a translation lattice or a translation hypergraph, as described in further detail below.

A second decoder 110 then processes the translation hypotheses 108. While the first decoder 104 is generally aimed at maximizing the posterior probability of the translation, i.e., matching the input to what the historical collection of documents 106 may indicate to be a best match to past expert manual translations of other passages, the second decoder 110 is aimed at maximizing a quality measure for the translation. As such, the second decoder 110 may re-rank the candidate translations that reside in the translation lattice so as to produce a "best" translation that may be displayed to a user of the system 100. This translation is represented by the English sample 112 corresponding to the translation of the Chinese sample 102.

The second decoder 110 can use a process known as MBR decoding, which seeks the hypothesis (or candidate translation) that minimizes the expected error in classification. The process thus directly incorporates a loss function into the decision criterion for making a translation selection.

Example Translation Lattice and Translation Hypergraph

Figure 2:
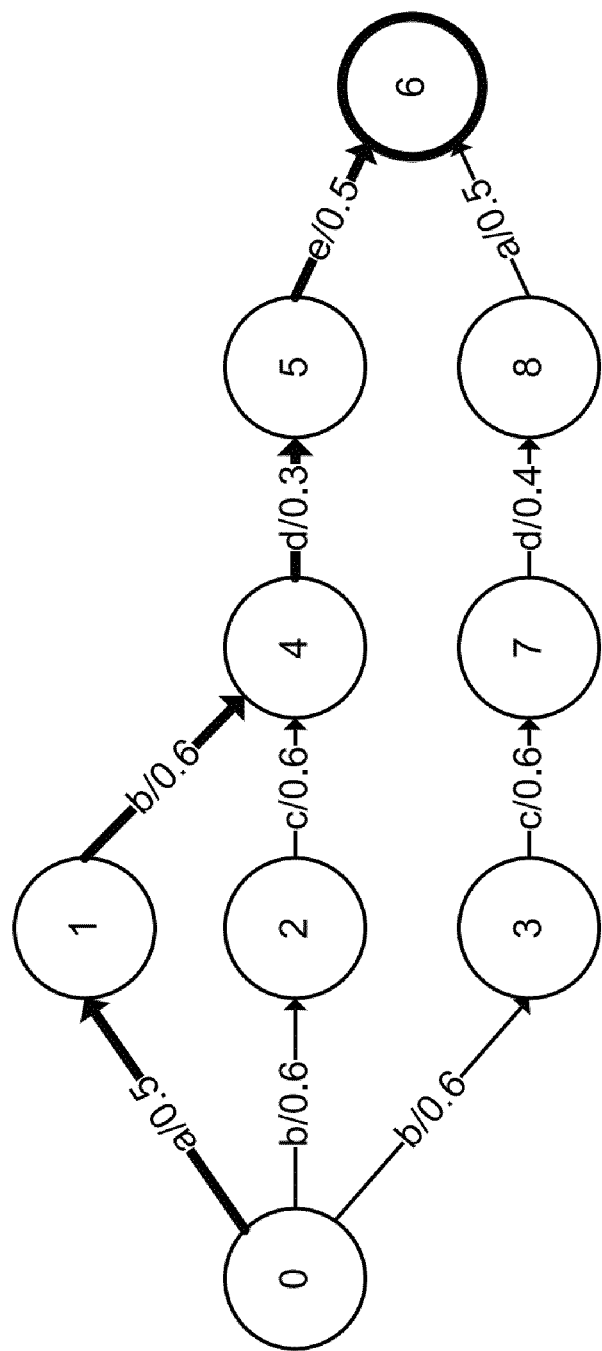
FIG. 2 illustrates an example translation lattice.

FIG. 2 illustrates an example translation lattice 200. In particular, translation lattice 200 is a translation n-gram lattice that can be considered to be a compact representation for very large N-best lists of translation hypotheses and their likelihoods. Specifically, the lattice is an acyclic weighted finite state acceptor including states (e.g., nodes 0 through 6) and arcs (or edges) representing transitions between states. Each arc is associated with an n-gram (e.g., a word or phrase) and a weight. For example, in translation lattice 200, n-grams are represented by labels "a", "b", "c", "d", and "e". State 0 is connected to a first arc that provides a path to state 1, a second arc that provides a path to state 4 from state 1, and a third arc that provides a path to state 5 from state 4. The first arc is associated with "a" and weight 0.5, the second arc is associated with "b" and weight 0.6, and the third arc is also associated with "d" and weight 0.3.

Each path in the translation lattice 200, including consecutive transitions beginning at an initial state (e.g., state 0) and ending at a final state (e.g., state 6), expresses a candidate translation. Aggregation of the weights along a path produces a weight of the path's candidate translation J(E, F) according to the model. The weight of the path's candidate translation represents the posterior probability of the translation E given the source sentence F as:

$$P(E \mid F) = \frac{\exp(\alpha \cdot J(E, F))}{\sum_{E' \in \Psi} \exp(\alpha \cdot J(E', F))},$$

where $\alpha \in (0, \infty)$ is a scaling factor that flattens the distribution when $\alpha<1$, and sharpens the distribution when $\alpha>1$.

Figure 3:
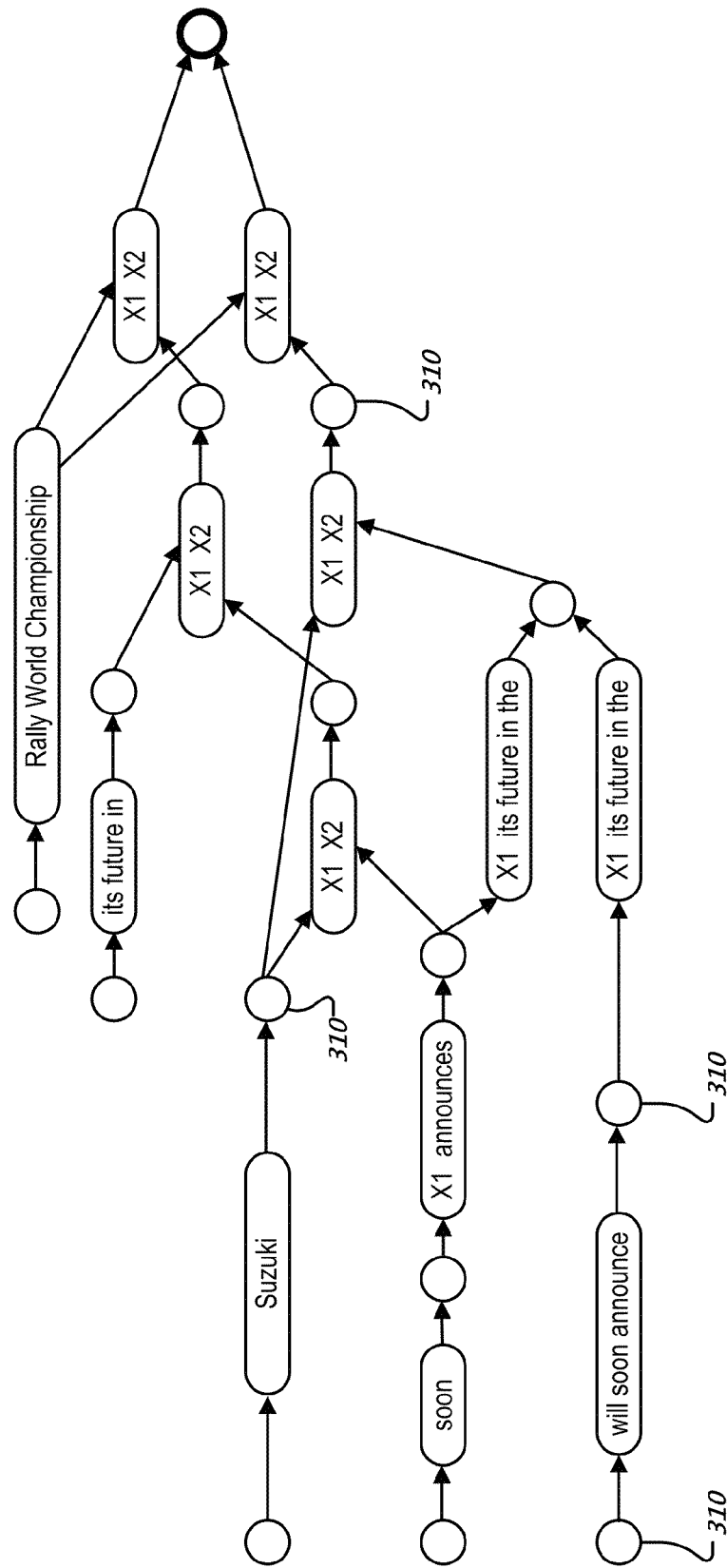
FIG. 3 illustrates an example translation hypergraph.

FIG. 3 illustrates an example translation hypergraph. Specifically, the translation hypergraph is a directed hypergraph. In some implementations, the translation hypergraph is produced by a Synchronous Context Free Grammars (SCFG)-based machine translation system. A hypergraph is a pair $H = \langle V, \epsilon \rangle$ that includes a set of vertices (or nodes) V, e.g., vertices 310, and a set of hyperedges (or links) $\epsilon \subset V^* \times V$. In particular, a hyperedge is a non-empty subset of V. Each hyperedge $e \in \epsilon$ connects a head vertex h(e) with a sequence of tail vertices $T(e) = \{v_1, \ldots, v_n\}$. A number of tail vertices is called the arity (|e|) of a hyperedge. If the arity of a hyperedge is zero, h(e) is a source vertex. The arity of a hypergraph is the maximum arity of its hyperedges. A hyperedge of arity 1 is a regular edge, and a hypergraph of arity 1 is a regular graph, i.e., a lattice. Each hyperedge can be associated with a rule $r_e$ from the SCFG. A number of nonterminals, e.g., phrase pairs, on the right-hand side of $r_e$ corresponds with the arity of e. Following a path in a translation hypergraph produces a translation hypothesis E and its associated sequence of SCFG rules, i.e., a derivation tree for E.

Minimum Bayes Risk Decoding

Minimum Bayes-Risk (MBR) decoding aims to find a translation hypothesis, e.g., a candidate translation, that has the least expected error under the probability model. Statistical machine translation can be described as mapping of input text F in a source language to translated text E in a target language. A decoder $\delta(F)$, e.g., decoder 104, can perform the mapping. If the reference translation E is known, the decoder performance can be measured by the loss function $L(E, \delta(F))$. Given such a loss function $L(E, E')$ between an automatic translation E' and the reference translation E, and an underlying probability model $P(E, F)$, the MBR decoder, e.g., the second decoder 110, can be represented by:

$$\hat{E} = \operatorname*{argmin}_{E' \in \Psi} R(E') = \operatorname*{argmin}_{E' \in \Psi} \sum_{E \in \Psi} L(E, E') P(E \mid F),$$

where R(E) represents the Bayes risk of candidate translation E' under the loss function L, and $\Psi$ represents the space of translations. For N-best MBR, the space $\Psi$ is an N-best list produced, for example, by the first decoder 104. When a translation lattice is used, $\Psi$ represents candidate translations encoded in the translation lattice. Furthermore, when a translation hypergraph is used $\Psi$ represents candidate translations encoded in the translation hypergraph.

If the loss function between any two hypotheses can be bounded, i.e., $L(E, E') \leq L_{max}$, the MBR decoder can be written in terms of a gain function, $G(E, E') = L_{max} - L(E, E')$, as:

$$\hat{E} = \operatorname*{argmax}_{E' \in \Psi} \sum_{E \in \Psi} G(E, E') P(E \mid F). \quad \text{(Eq. 1)}$$

In some implementations, MBR decoding uses different spaces for hypothesis selection and risk computation. For example, the hypothesis can be selected from a translation lattice and the risk can be computed based on a translation hypergraph. In the example, the MBR decoder can be rewritten as:

$$\hat{E} = \operatorname*{argmax}_{E' \in \Psi_h} \sum_{E \in \Psi_e} G(E, E') P(E \mid F)$$

where $\Psi_h$ represents the hypothesis space and $\Psi_e$ represents an evidence space used for computing Bayes risk.

MBR decoding can be improved by using larger spaces, i.e., hypothesis and risk computation spaces. Lattices and hypergraphs can include more candidate translations than an N-best list. For example, lattices and hypergraphs can include more than one billion candidate translations. As such, representing the hypothesis and risk computation spaces using lattices or hypergraphs increases the accuracy of MBR decoding, thereby increasing the likelihood that an accurate translation is provided.

In some implementations, a gain function G is expressed as a sum of local gain functions $g_i$. A gain function can be considered to be a local gain function if it can be applied to all paths in a lattice using Weighted Finite State Transducers (WFSTs) composition, resulting in a o(N) increase in the number of states N in the lattice. The local gain functions can weight n-grams. For example, given a set of n-grams $N = \{w_1, \ldots, w_{|N|}\}$, a local gain function $g_w : \epsilon \times \epsilon \to \Re$, where $w \in N$, can be expressed as:

$$g_w(E \mid E') = \theta_w \cdot \#_w(E') \cdot \delta_w(E),$$

where $\theta_w$ is a constant, $\#_w(E')$ is a number of times that w occurs in E', and $\delta_w(E)$ is 1 if $w \in E$ and 0 otherwise. Assuming that the overall gain function G(E, E') can be written as a sum of local gain functions and a constant $\theta_0$ times the length of the hypothesis E', the overall gain function can be expressed as:

$$G(E, E') = \theta_0 |E'| + \sum_{w \in N} g_w(E \mid E') = \theta_0 |E'| + \sum_{w \in N} \theta_{|w|} \cdot \#_w(E') \cdot \delta_w(E).$$

Using this overall gain function, the risk, i.e., $$\sum_{E' \in \Psi} G(E, E') P(E \mid F),$$

can be rewritten such that the MBR decoder for the lattice (in Equation 1) is expressed as:

$$\hat{E} = \operatorname*{argmax}_{E' \in \Psi} \theta_0 |E'| + \sum_{w \in N} \theta_{|w|} \cdot \#_w(E') \cdot P(w \mid \Psi), \quad \text{(Eq. 2)}$$

where $P(w|\Psi)$ is the posterior probability of the n-gram w in the lattice, and can be expressed as:

$$P(w|\Psi) = \sum_{E \in \Psi} 1_w(E) \cdot P(E|F). \quad \text{(Eq. 3)}$$

Efficient MBR Decoding

The posterior probability $P(w|\Psi)$ of Equation 3 can be expressed as:

$$P(w|\Psi) = \sum_{E \in \Psi} \sum_{e \in E} f(e, w, E) P(E|F),$$

where f(e,w,E) is a score assigned to edge e on path E containing n-gram w. Furthermore, f(e,w,E)=1 when w∈e, $P(e|\Psi)$ >$P(e'|\Psi)$, and e' precedes e on E; otherwise, f(e,w,E)=0. In other words, for each path E, the edge that contributes n-gram w and has the highest edge posterior probability relative to its predecessors on the path E is counted.

Because f(e,w,E) is calculated based on the full path of E, f(e,w,E) can be calculated based on local statistics by using an approximation f*(e,w,$\Psi$) that counts the edge e with n-gram w that has the highest arc posterior probability relative to predecessors in the entire lattice $\Psi$. As a result, an approximation of the posterior probability $P(w|\Psi)$ can be expressed as:

$$P(w|\Psi) = \sum_{E \in \Psi} \sum_{e \in E} f^*(e, w, \Psi) \cdot P(E|F) =$$

$$\sum_{e \in E} 1_{w \in e} \cdot f^*(e, w, \Psi) \sum_{E \in \Psi} 1_E(e) \cdot P(E|F) =$$

$$\sum_{e \in E} 1_{w \in e} \cdot f^*(e, w, \Psi) \cdot P(e|\Psi),$$

where $P(e|\Psi)$ is the posterior probability of a lattice edge.

Figure 4:
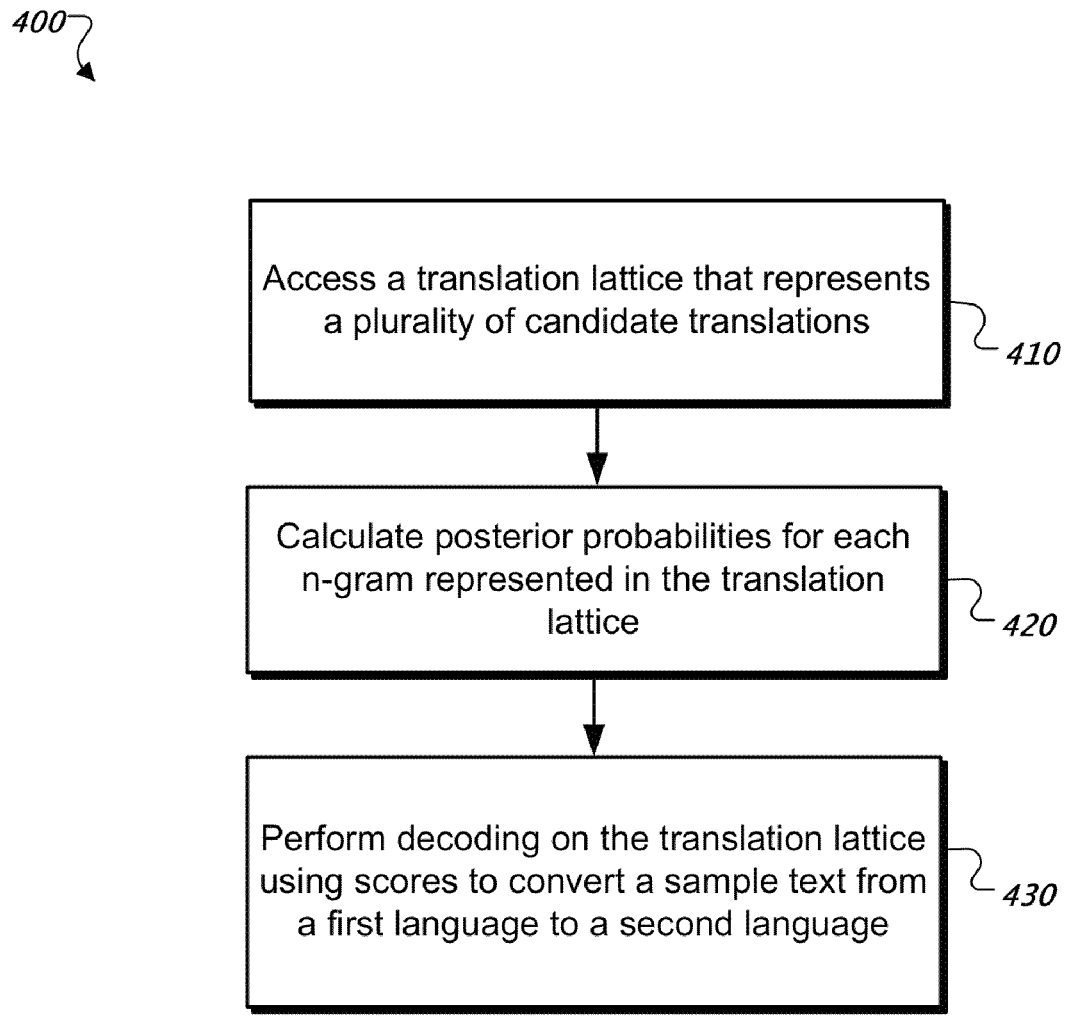
FIG. 4 shows an example process for efficient MBR decoding of a translation lattice.

FIG. 4 shows an example process 400 for efficient MBR decoding of a translation lattice. For convenience, efficient MBR decoding of a lattice will be described with respect to a system that performs the decoding. The system accesses 410 a translation lattice that represents candidate translations. The translation lattice includes paths including nodes connected by edges. In particular, the system can sort the lattice nodes topologically. For example, the nodes in the lattice can be sorted according to the arrangement in which the nodes are connected to each other in the lattice. In some implementations, the system calculates backward probabilities of each node. In particular, each node represents a state in the lattice, and the backward probability of a particular node is the probability of producing a sequence of words (e.g., a sentence) given that the current location in traversing a path of the lattice is the particular node (or state).

The system calculates 420 posterior probabilities for each n-gram represented in the translation lattice. The calculation includes determining, for each node, a score for each n-gram that is represented by a path from a source node of the translation lattice to the node, where the score is a highest posterior probability for edges on paths that include the n-gram. In particular, for each node t in the lattice, a score Score(w,t) is calculated for each n-gram w that lies on a path from the source node to t. Each n-gram w introduced by each edge e, e.g., identified by propagating n-grams suffixes terminating on each node, is processed to determine a final value of Score(w,t) that it is the highest posterior probability among all edges on the paths that terminate on t and contain n-gram w. The system then associates each edge with a score using the risk (or cost) calculated using Equation 2 above.

The system performs 430 decoding on the translation lattice using the scores to convert a sample text from a first language to a second language. For example, the system uses the MBR decoder to identify the path in the lattice that ideally represents the most likely translation.

The technique described in reference to FIG. 4 can be refined to rescore translation hypergraphs generated by a SCFG based machine translation system.

Figure 5:
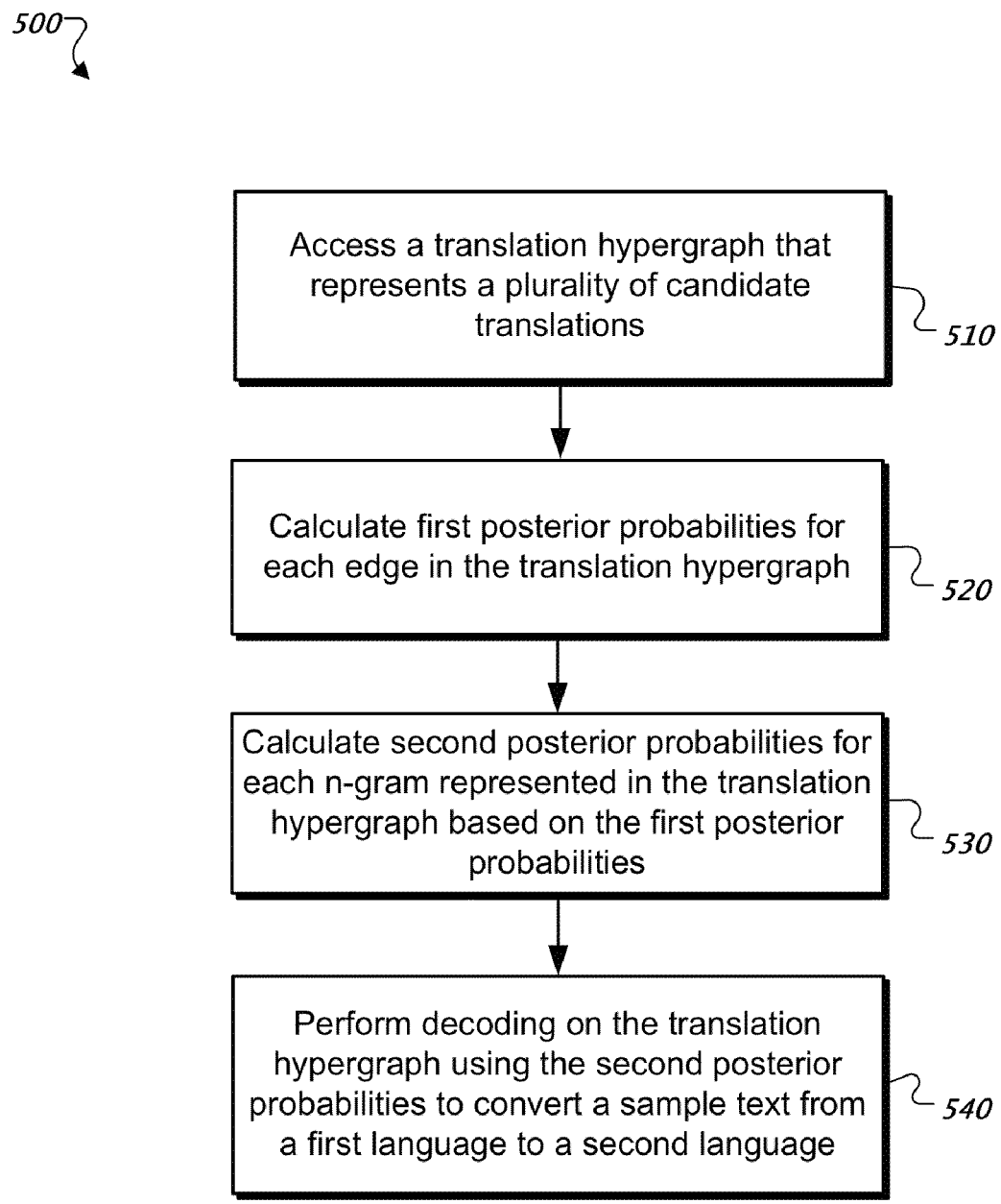
FIG. 5 shows an example process for efficient MBR decoding of a translation hypergraph.

FIG. 5 shows an example process 500 for efficient MBR decoding of a translation hypergraph. For convenience, efficient MBR decoding of a hypergraph will be described with respect to a system that performs the decoding. The system accesses 510 a translation hypergraph that represents candidate translations. The translation hypergraph includes paths including nodes connected by edges. In particular, the system can sort the hypergraph nodes topologically. For example, the nodes in the hypergraph can be sorted according to the arrangement in which the nodes are connected to each other in the lattice.

In some implementations, the system calculates inside probabilities of each node. In particular, the inside probability of a particular node is the probability of producing a sequence of words (e.g., a sentence) given that the current location in traversing a path of the hypergraph is the particular node, i.e., a nonterminal.

The system calculates 520 first posterior probabilities for each edge in the translation hypergraph, e.g., $P(e|\Psi)$. The system calculates 530 second posterior probabilities for each n-gram represented in the translation hypergraph based on the first posterior probabilities. Each n-gram w on the tail nodes T(e), e.g., identified by propagating n-gram prefixes and suffixes at each node, is processed to determine a final value of Score(w, T(e)) that it is the highest posterior probability among all hyperedges on the paths that contain n-gram w. Propagating n-gram prefixes and suffixes is necessary because, in a hypergraph, n-grams can be represented by concatenating lower order n-grams (e.g., words) from either side of a node. In some implementations, n-grams on the tail nodes are compared for each hyperedge e in the hypergraph. The highest Score(w, T(e)) is used for duplicate n-grams, e.g., same n-grams, that occur from propagating multiple tail nodes. The system applies the rule (e.g., SCFG rule) on hyperedge e to the n-grams on T(e). The system then associates each hyperedge with a score using the risk (or cost) calculated using Equation 2 above.

The system performs 540 decoding on the translation hypergraph using the second posterior probabilities to convert a sample text from a first language to a second language. For example, the system uses the MBR decoder to identify the path in the hyperedge that ideally represents the most likely translation.

Minimum Error Rate Training (MERT) Overview

Minimum error rate training (MERT) measures an error metric of a decision rule for classification, e.g., MBR decision rule using a zero-one loss function. In particular, MERT estimates model parameters such that the decision under the zero-one loss function maximizes an end-to-end performance measure on a training corpus. In combination with log-linear models, the training procedure optimizes an unsmoothed error count. As previously stated, the translation that maximizes the a-posteriori probability can be selected based on $$\operatorname*{argmax}_{e} P(e \mid f).$$

Here, e represents a translation in a target language (e.g., an English translation) and f represents text in a source language (e.g., a French sentence).

Since the true posterior distribution is unknown, P(e|f) is approximated with a log-linear translation model, for example, which combines one or more feature functions $h_m(e,f)$ with feature function weights $\lambda_m$, where m=1, . . . , M. The log-linear translation model can be expressed as:

$$P(e \mid f) = P_{\lambda_1^M}(e \mid f) = \frac{\exp\left[\sum_{m=1}^{M} \lambda_m h_m(e, f)\right]}{\sum_{e'} \exp\left[\sum_{m=1}^{M} \lambda_m h_m(e', f)\right]}.$$

The feature function weights are the parameters of the model, and the MERT criterion finds a parameter set $\lambda_1^M$ that minimizes the error count on a representative set of training sentences using the decision rule, e.g., $$\operatorname*{argmax}_{e} P(e \mid f).$$

Given source sentences $f_1^S$ of a training corpus, reference translations $r_1^S$, and a set of K candidate translations $C_s = \{e_{s,1}, \ldots, e_{s,K}\}$, the corpus-based error count for translations $e_1^S$ is additively decomposable into error counts of individual sentences, i.e., $E(r_1^S, e_1^S) = \sum_{s=1}^{S} E(r_1, e_1)$. The MERT criterion can be expressed as:

$$\hat{\lambda}_1^M = \operatorname*{argmin}_{\lambda_1^M} \left\{ \sum_{s=1}^{S} E(r_s, \hat{e}(f_s; \lambda_1^M)) \right\} =$$

$$\operatorname*{argmin}_{\lambda_1^M} \left\{ \sum_{s=1}^{S} \sum_{k=1}^{K} E(r_s, r_{s,k}) \delta(\hat{e}(f_s; \lambda_1^M), e_{s,k}) \right\},$$

where $\hat{e}(f_s; \lambda_1^M) = \operatorname*{argmax}_{e} \left\{ \sum_{m=1}^{M} \lambda_m h_m(e, f_s) \right\}.$ A line optimization technique can be used to train a linear model under the MERT criterion. The line optimization determines, for each feature function $h_m$ and sentence $f_s$, the exact error surface on a set of candidate translations $C_s$. The feature function weights are then adjusted by traversing the combined error surfaces of sentences in the training corpus and setting weights to a point where the resulting error is a minimum.

The most probable sentence hypothesis in $C_s$ along a line $\lambda_1^M + \gamma \cdot d_1^M$ can be defined as:

$$\hat{e}(f_s; \gamma) = \operatorname*{argmax}_{e \in C_s} \{(\lambda_1^M + \gamma \cdot d_1^M)^T \cdot h_1^M(e, f_s)\}.$$

The total score for any candidate translation corresponds to a line in the plane with γ as the independent variable. Overall, $C_s$ defines K lines where each line may be divided into at most K line segments due to possible intersections with other K−1 lines.

For each γ, the decoder (e.g., the second decoder 110) determines a respective candidate translation that yields the highest score and therefore corresponds to a topmost line segment. A sequence of topmost line segments constitute an upper envelope that is a point-wise maximum over all lines defined by $C_s$. The upper envelope is a convex hull and can be inscribed with a convex polygon whose edges are the segments of a piecewise linear function in γ. In some implementations, the upper envelope is calculated using a sweep line technique. Details of the sweep line technique are described, for example, in W. Macherey, F. Och, I. Thayer, and J. Uzskoreit, *Lattice-based Minimum Error Rate Training for Statistical Machine Translation*, Proceedings of the 2008 Conference on Empirical Methods in Natural Language Processing, pages 725-734, Honolulu, October 2008.

In summary, the upper envelope provides an exhaustive representation of all possible outcomes that the decoder may yield if γ is shifted along a given direction. Translation candidates of an upper envelope's constituent line segments can be projected onto corresponding error counts to produce an exact and unsmoothed error surface for all candidate translations defined by $C_s$. The error surface can be traversed to find γ under which $\lambda_1^M + \hat{\gamma} \cdot d_1^M$ minimizes a global error.

MERT on Hypergraphs

MERT can be applied to a hypergraph to efficiently calculate and represent upper envelopes (e.g., error surfaces) over all candidate translations represented in the hypergraph. As an overview, envelopes are generated from the hypergraph's source nodes bottom-up to its unique root node, thereby expanding the envelopes through application of SCFG rules to partial candidate translations that are associated with the envelope's constituent line segments. The envelopes are combined using a sum operation and maximum operation over convex polygons, as described in further detail below.

Figure 6:
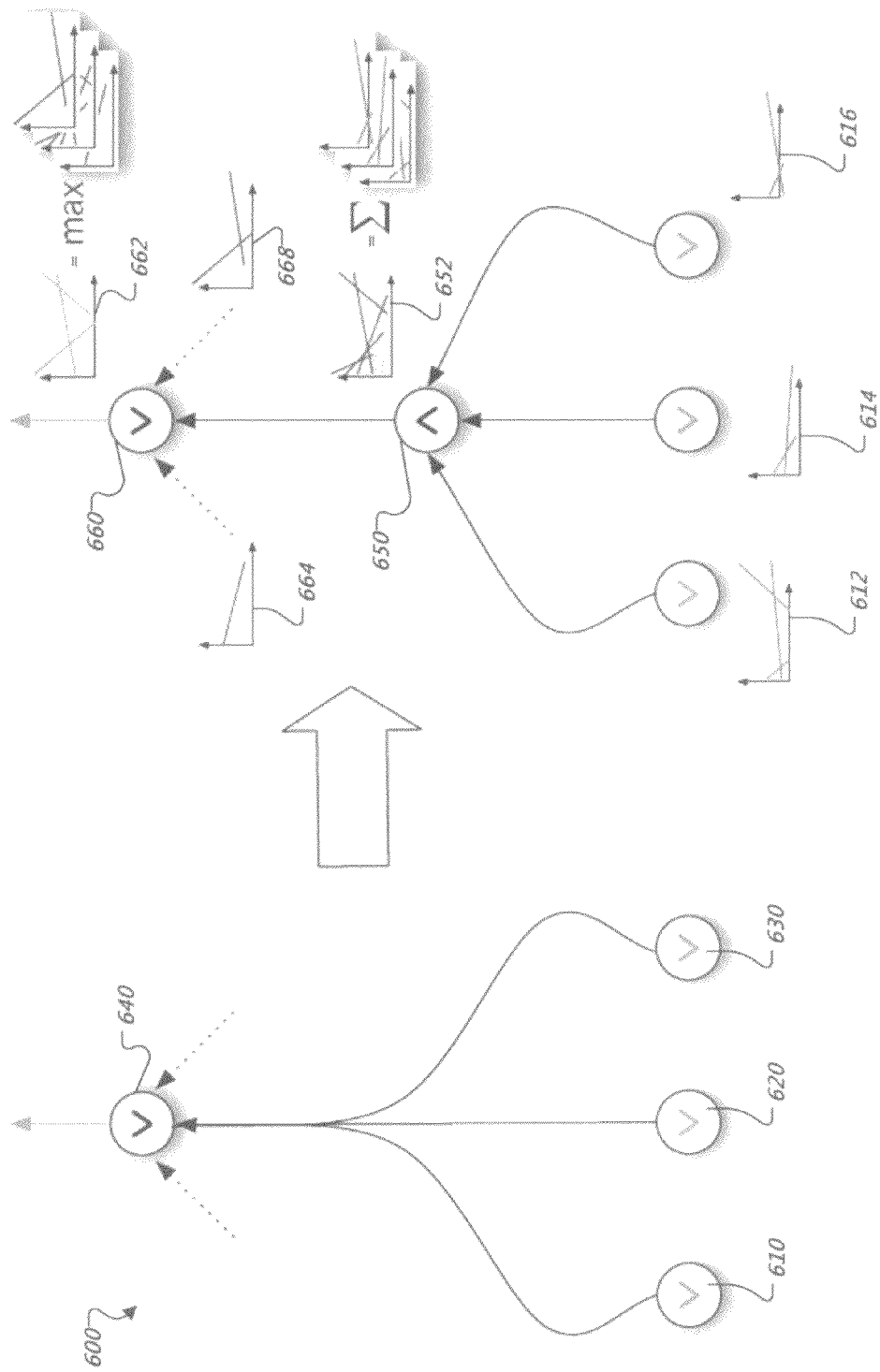
FIG. 6 includes an example transformation of a hypergraph into a factor graph.

FIG. 6 includes an example transformation of a hypergraph into a factor graph 600. In particular, FIG. 6 shows an isomorphic transformation, specifically a transformation of a hyperedge with arity 3. The hypergraph H=⟨ V, ϵ ⟩ is transformed into a factor graph with nodes identified by type. All vertices v E V are marked with a symbol ∨, e.g., nodes 610, 620, and 630. Each hyperedge e∈ϵ, |e|>1, is replaced with a subgraph including a new vertex $vv_\wedge$ (e), e.g., node 640. Incoming and outgoing edges of $vv_\wedge$ (e) connect the same head and tail nodes in the factor graph as were connected by e in the hypergraph. The unique outgoing edge of $vv_\wedge$ (e) is associated with rule $r_e$, and incoming edges are not linked to rules.

Rules associated with hyperedges specify how line segments in the envelopes of the corresponding hyperedge's tail nodes can be combined. As an example, a hyperedge e can be associated with a rule $r_e$: X→$aX_1bX_2c$, and T(e)={$v_1, v_2$}. $X_1$ and $X_2$ are substituted in the rule with candidate translations associated with line segments in envelopes $Env(v_1)$ and $Env(v_2)$, respectively.

Calculating and propagating tail envelopes over a hyperedge e to its head node is performed by specifying how envelopes associated with tail vertices are propagated to the head vertex for the node types $\vee$ and $\wedge$.

An envelope, e.g., envelope 652, is calculated from a node marked with the symbol $\wedge$, e.g., node 650, by summing envelopes of the incoming edges, e.g., envelopes 612, 614, and 616. In some implementations, the sum is calculated using a Minkowski sum. Because the envelopes of the incoming edges are convex hulls, the Minkowski sum provides an upper bound to the number of line segments that constitute the resulting envelope, i.e., the bound is the sum over the number of line segments in the envelopes of the incoming edges, or $$|Env(v_\wedge(e))| \leq \sum_{v_\vee \in T(e)} |Env(v_\vee)|,$$

where $Env(v)$ is an upper envelope. Using the Minkowski sum can be advantageous because the growth rate of the calculation is linear ($O(n)$) with respect to the size of the individual envelopes.

An envelope, e.g., envelope 662, is calculated from a node marked with the symbol $\vee$, e.g., node 660, by calculating the union of envelopes of the incoming edges, e.g., envelopes 664 and 668. The union, or "max", can be calculated using a sweep line technique. Details of the sweep line technique are described, for example, in W. Macherey, F. Och, I. Thayer, and J. Uzskoreit, Lattice-based Minimum Error Rate Training for Statistical Machine Translation, Proceedings of the 2008 Conference on Empirical Methods in Natural Language Processing, pages 725 734, Honolulu, October 2008.

Traversing all nodes in H bottom-up in topological order, for each node $v \in V$, the envelopes associated with tail nodes $T(e)$ for each incoming hyperedge of the node are combined by summing the envelopes as described above. Then, for each incoming hyperedge e, the resulting envelope is expanded by applying a rule $r_e$ to its constituent line segments. Envelopes associated with different incoming hyperedges of node v are combined (and reduced), e.g., by calculating the union as described above.

Figure 7:
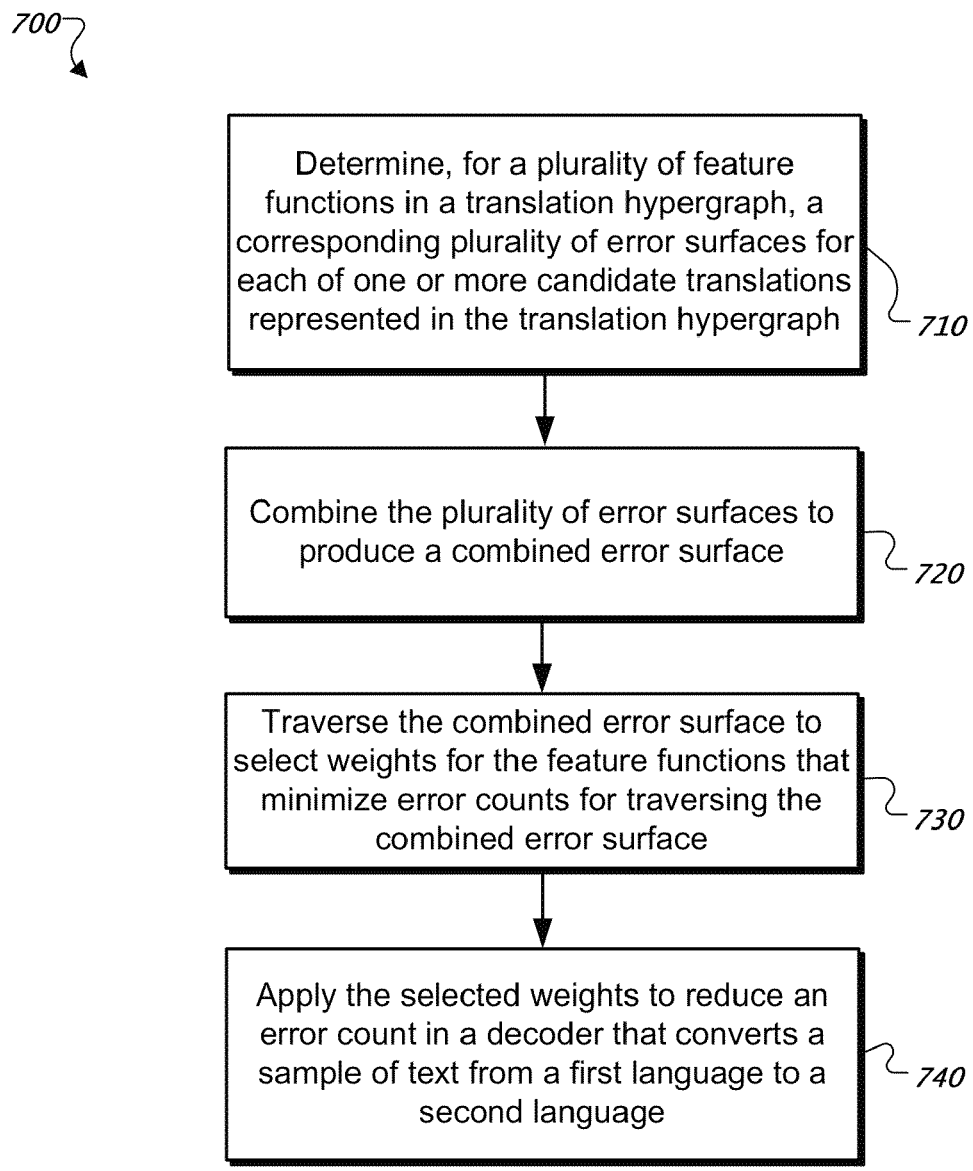
FIG. 7 shows an example process for efficient MERT on a translation hypergraph.

FIG. 7 shows an example process 700 for efficient MERT on a translation hypergraph. For convenience, efficient MERT on a translation hypergraph will be described with respect to a system that performs the MERT. The system determines 710, for feature functions in a translation hypergraph, a corresponding collection of error surfaces for each of one or more candidate translations represented in the translation hypergraph. The system combines 720 the error surfaces to produce a combined error surface. The system traverses 730 the combined error surface to select weights for the feature functions that minimize error counts for traversing the combined error surface. The system applies 740 the selected weights to reduce an error count in a decoder that converts a sample of text from a first language to a second language.

Other implementations are possible. In some implementations, the technique described with reference to FIGS. 6 and 7 is applied to a translation lattice. In some implementations, the technique described with reference to FIGS. 6 and 7 is applied to the local gain function G(E, E') for MBR. Applying the technique is particularly advantageous when user selection (e.g., manual selection) of parameters in G(E, E') are not accurate for unobserved test data or language pairs. As an example, the parameters in G(E, E') can be considered accurate when a Kendal tau rank correlation coefficient between a ranking using G(E, E') and a ranking using an exact BLEU score is greater than or equal to 0.8. A BLEU score is an indicator of translation quality of text which has been machine translated. Additional details of BLEU are described in K. Papineni, S. Roukes, T. Ward, and W. Zhu, 2001, BLEU: a Method for Automatic Evaluation of Machine Translation, Technical Report RC22176 (WO109-022), IBM Research Division. Additional details of the linear approximation to the BLEU score are described in R. Tromble, S. Kumar, F. Och, and W. Macherey, 2008, *Lattice Minimum Bayes-Risk Decoding for Statistical Machine Translation*, in EMNLP, Honolulu, Hi.

The MBR decoder of Equation 2, above, can be rewritten as a linear model:

$$\hat{E} = \arg\max_{E' \in \Psi} \Sigma_{i=0}^N \theta_i g_i(E',F).$$

where $g_0(E',F)=|E'|$ and $g_i(E', F)=\Sigma_{w:|w|=i} \#_w(E')P(w|\Psi)$.

When the linear approximation to the BLEU score is not accurate, the decoder selects a MAP translation as a backoff. In these and other implementations, an additional feature function $g_{N+1}(E,F)$ equal to the original decoder cost for the sentence is used. A weight assignment of 1.0 for this feature function and zero for other feature functions indicates that a MAP translation is selected. As a result, N+2 feature functions are optimized using MERT to determine the highest BLEU score on a training set.

Figure 8:
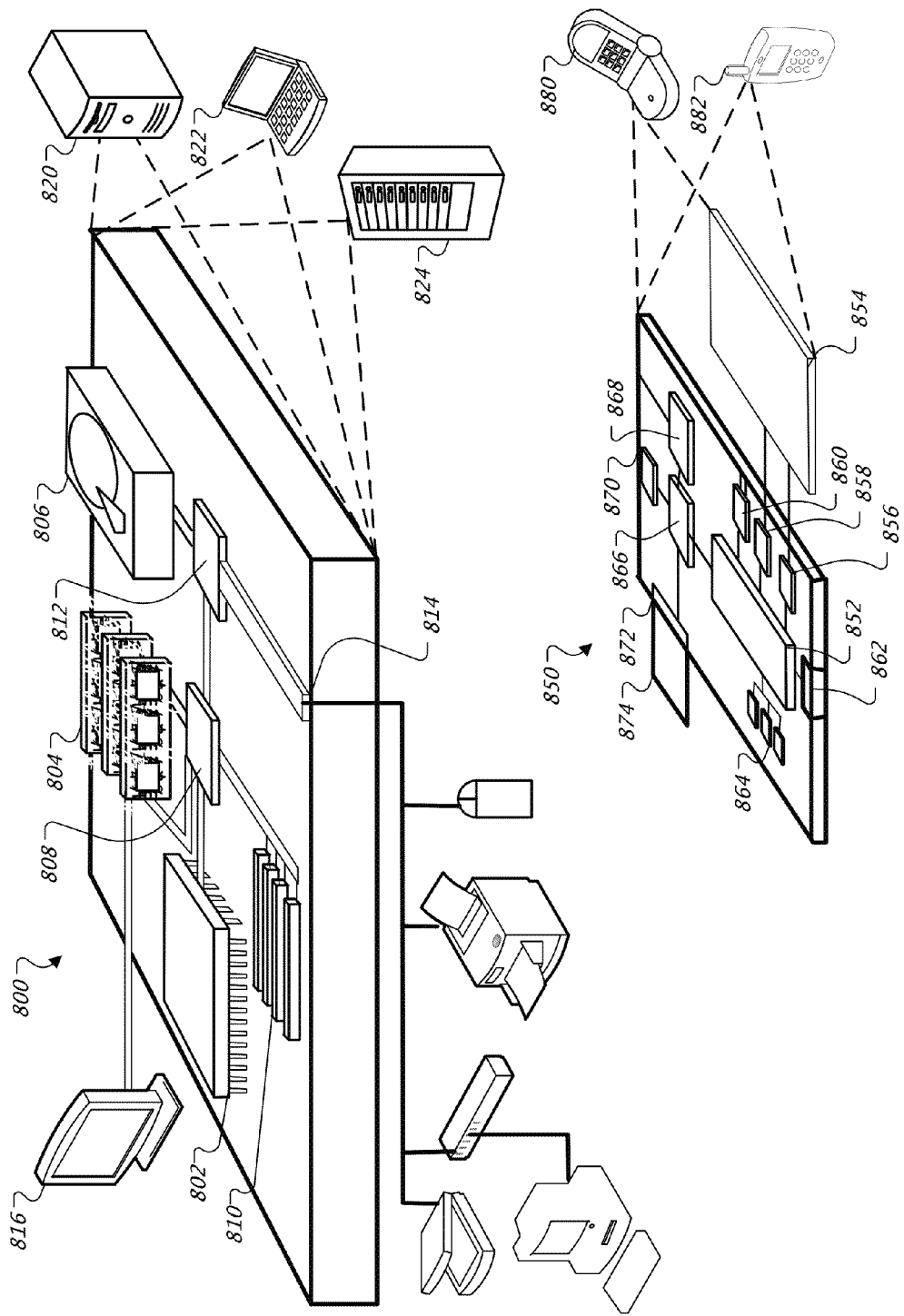
FIG. 8 shows an example of a generic computer device and a generic mobile device.

FIG. 8 shows an example of a generic computer device 800 and a generic mobile computer device 850, which may be used with the techniques (e.g., processes 400, 500, and 700) described. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the systems and techniques described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 868, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   determining, at a computing device including a processor, a plurality of error surfaces corresponding to a plurality of feature functions in a translation hypergraph, for each of one or more candidate translations represented in the translation hypergraph, including:
      generating, at the computing device, a factor graph from the translation hypergraph, wherein the factor graph is an isomorphic transformation of the translation hypergraph, and
      generating, at the computing device, the plurality of error surfaces from the factor graph;
   combining, at the computing device, the plurality of error surfaces to produce a combined error surface;
   traversing, at the computing device, the combined error surface to select weights for the feature functions that minimize error counts for traversing the combined error surface; and
   applying, at the computing device, the selected weights to reduce an error count in a decoder that converts a sample of text from a first language to a second language.

2. The computer-implemented method of claim 1, further comprising:
   generating, at the computing device, the translation hypergraph using Synchronous Context Free Grammars (SCFG).

3. The computer-implemented method of claim 2, further comprising applying, at the computing device, SCFG rules to line segments represented in the plurality of error surfaces to expand the plurality of error surfaces, wherein combining the plurality of error surfaces further includes calculating a sum of one or more first error surfaces and calculating a union of one or more second error surfaces.

4. The computer-implemented method of claim 3, wherein the sum is a Minkowski sum.

5. The computer-implemented method of claim 3, further comprising calculating, at the computing device, the union of the one or more second error surfaces using a sweep line technique.

6. The computer-implemented method of claim 1, wherein the selected weights are applied to select a first candidate translation using Minimum-Bayes Risk (MBR).

7. The computer-implemented method of claim 6, further comprising:
performing, at the computing device, a backoff; and
using, at the computing device, Maximum A Posteriori (MAP) based on at least one of the selected weights to determine a second candidate translation.

8. The computer-implemented method of claim 7, wherein using MBR further includes calculating, at the computing device:

$$\hat{E} = \arg\max_{E' \in \Psi} \Sigma_{i=0}^{N} \theta_i g_i(E', F),$$

where $g_0(E', F) = |E'|$, $g_i(E', F) = \Sigma_{w:|w|=i} \#_w(E') P(w|\Psi)$, and wherein $g(E', F)$ represents a feature function, $\Psi$ represents the translation hypergraph, $\theta_i$ represents the selected weights, $E'$ represents a candidate translation, $F$ represents the sample text in the first language, $w$ represents an n-gram, and $\#_w$ represents a number of times $w$ occurs in $E'$.

9. The computer-implemented method of claim 1, further comprising generating, at the computing device, a command for the decoder, wherein the command causes the decoder to:
receive the sample of text in the first language;
perform statistical machine translation of the sample of text from the first language to the second language using the translation hypergraph to obtain a translated sample of text; and
output the translated sample of text.

10. A non-transitory computer program product, encoded on a tangible program carrier, operable to cause a data processing apparatus to perform operations comprising:
determining a plurality of error surfaces corresponding to a plurality of feature functions in a translation hypergraph, for each of one or more candidate translations represented in the translation hypergraph, including:
generating a factor graph from the translation hypergraph, wherein the factor graph is an isomorphic transformation of the translation hypergraph, and
generating the plurality of error surfaces from the factor graph;
combining the plurality of error surfaces to produce a combined error surface;
traversing the combined error surface to select weights for the feature functions that minimize error counts for traversing the combined error surface; and
applying the selected weights to reduce an error count in a decoder that converts a sample of text from a first language to a second language.

11. The computer program product of claim 10, wherein the operations further include generating the translation hypergraph using Synchronous Context Free Grammars (SCFG).

12. The computer program product of claim 11, wherein the operations further include applying SCFG rules to line segments represented in the plurality of error surfaces to expand the plurality of error surfaces, and wherein combining the plurality of error surfaces further includes calculating a sum of one or more first error surfaces and calculating a union of one or more second error surfaces.

13. The computer program product of claim 12, wherein the sum is a Minkowski sum.

14. The computer program product of claim 12, wherein the operations further include calculating the union of the one or more second error surfaces using a sweep line technique.

15. The computer program product of claim 10, wherein the selected weights are applied to select a first candidate translation using Minimum-Bayes Risk (MBR).

16. The computer program product of claim 15, wherein the operations further include:
performing a backoff; and
using Maximum A Posteriori (MAP) based on at least one of the selected weights to determine a second candidate translation.

17. The computer program product of claim 16, wherein using MBR includes calculating:

$$\hat{E} = \arg\max_{E' \in \Psi} \Sigma_{i=0}^{N} \theta_i g_i(E', F),$$

where $g_0(E', F) = |E'|$, $g_i(E', F) = \Sigma_{w:|w|=i} \#_w(E') P(w|\Psi)$, and wherein $g(E', F)$ represents a feature function, $\Psi$ represents the translation hypergraph, $\theta_i$ represents the selected weights, $E'$ represents a candidate translation, $F$ represents the sample text in the first language, $w$ represents an n-gram, and $\#_w$ represents a number of times $w$ occurs in $E'$.

18. The computer program product of claim 10, wherein the operations further include generating a command for the decoder, the command causing the decoder to:
receive the sample of text in the first language;
perform statistical machine translation of the sample of text from the first language to the second language using the translation hypergraph to obtain a translated sample of text; and
output the translated sample of text.

* * * * *

UNITED STATES PATENT AND TRADEMARK OFFICE
CERTIFICATE OF CORRECTION

PATENT NO. : 8,401,836 B1
APPLICATION NO. : 13/528426
DATED : March 19, 2013
INVENTOR(S) : Shankar Kumar et al.

It is certified that error appears in the above-identified patent and that said Letters Patent is hereby corrected as shown below:

In the Claims:

Column 19, Line 19 at Claim 8, " $\hat{E} = \arg\max_{E' \in \Psi} \sum_{i=0}^{N} \theta_i g_i(E', F)$, " should be -- $\hat{E} = \arg\max_{E' \in \Psi} \sum_{i=0}^{N} \theta_i g_i(E', F)$, --.

Column 20, Line 34 at Claim 17, " $\hat{E} = \arg\max_{E' \in \Psi} \sum_{i=0}^{N} \theta_i g_i(E', F)$, " should be -- $\hat{E} = \arg\max_{E' \in \Psi} \sum_{i=0}^{N} \theta_i g_i(E', F)$, --.

Signed and Sealed this
Twenty-third Day of July, 2013

Teresa Stanek Rea
*Acting Director of the United States Patent and Trademark Office*